US010142393B2

(12) United States Patent
Sakai

(10) Patent No.: US 10,142,393 B2
(45) Date of Patent: Nov. 27, 2018

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Tomoya Sakai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 224 days.

(21) Appl. No.: 15/093,620

(22) Filed: Apr. 7, 2016

(65) Prior Publication Data
US 2016/0308935 A1    Oct. 20, 2016

(30) Foreign Application Priority Data

Apr. 15, 2015  (JP) ................. 2015-083327

(51) Int. Cl.
*H04L 29/08* (2006.01)
*H04L 29/06* (2006.01)

(52) U.S. Cl.
CPC .......... *H04L 67/02* (2013.01); *H04L 65/1069* (2013.01)

(58) Field of Classification Search
CPC .............. G06F 3/023; H04L 29/12358; H04L 63/0428; H04L 43/50; H04L 1/0061; H04L 43/10; H04L 29/06
USPC .......................... 709/230; 370/465, 229, 252
See application file for complete search history.

(56) References Cited

U.S. PATENT DOCUMENTS

| 5,706,434 | A * | 1/1998 | Kremen | H04L 29/06 707/999.01 |
|---|---|---|---|---|
| 6,590,885 | B1 * | 7/2003 | Jorgensen | H04L 1/20 370/328 |
| 6,631,120 | B1 * | 10/2003 | Milbrandt | H04L 29/06 370/252 |
| 7,694,051 | B2 * | 4/2010 | Wei | H04L 43/10 710/110 |
| 7,809,818 | B2 * | 10/2010 | Plamondon | G06F 12/0862 709/217 |
| 8,219,866 | B2 * | 7/2012 | Suzuki | H04L 1/0061 370/229 |
| 2003/0033417 | A1 * | 2/2003 | Zou | G06F 3/023 709/230 |
| 2005/0086020 | A1 * | 4/2005 | Mori | H04L 43/50 702/118 |

(Continued)

OTHER PUBLICATIONS

R. Fielding, Hypertext Transfer Protocol Version 1.1 (HTTP/1.1), specification, Jun. 1999, pp. 1-114, Version 1.1, Network Working Group (NWG), Reston, Virginia, USA (https://tools.ietf.org/html/rfc2616).

(Continued)

*Primary Examiner* — Frantz Coby
(74) *Attorney, Agent, or Firm* — Canon U.S.A., Inc. IP Division

(57) ABSTRACT

A communication apparatus includes a first acquisition unit and a determination unit. The first acquisition unit acquires a number of messages to be transmitted to another communication apparatus. The determination unit determines, based on the number of messages acquired by the first acquisition unit, a communication protocol to be used for a communication with the another communication apparatus from a plurality of communication protocols.

14 Claims, 10 Drawing Sheets

(56) References Cited

U.S. PATENT DOCUMENTS

2008/0172494 A1* 7/2008 Kim .................. H04L 63/0428
709/230
2009/0059953 A1* 3/2009 Kulkarni .......... H04L 29/12358
370/465

OTHER PUBLICATIONS

M. Belshe, Hypertext Transfer Protocol Version 2 (HTTP/2), specification, May 2015, pp. 1-96, Version 2, Internet Engineering Task Force (IETF), Fremont, California, USA (https://tools.ietf.org/html/rfc7540).

* cited by examiner

| SERVER IDENTIFIER (Session-ID, IP/Port, URI) | HISTORY INFORMATION (MAXIMUM NUMBER OF CONNECTIONS USABLE FOR HTTP/1.1 COMMUNICATION, NUMBER OF REQUESTS, AVAILABILITY OF HTTP/2 COMMUNICATION) |
|---|---|
| 6d f3 02 8a 44 a7 42 94 14 7b 59 ad 8f 00 32 71 e9 a5 d1 bc 3f c0 23 0c 50 fa 4f 9f 27 cf 45 c4 (Session id) | MAXIMUM NUMBER OF CONNECTIONS : 5 NUMBER OF REQUESTS : 3 AVAILABILITY OF HTTP/2 COMMUNICATION : AVAILABLE |
| 200.100.100.1:8080 (IP/Port) | MAXIMUM NUMBER OF CONNECTIONS : 2 NUMBER OF REQUESTS : 6 AVAILABILITY OF HTTP/2 COMMUNICATION : AVAILABLE |
| www.abc-sample.com (URI) | MAXIMUM NUMBER OF CONNECTIONS : 4 NUMBER OF REQUESTS : 1 AVAILABILITY OF HTTP/2 COMMUNICATION : NOT AVAILABLE |

COMMUNICATION APPARATUS, COMMUNICATION METHOD, AND STORAGE MEDIUM

BACKGROUND

Field of the Disclosure

The present disclosure relates to a communication apparatus, a communication method, and a storage medium, and more particularly relates to a communication apparatus, a communication method, and a storage medium suitably used for a communication with an external device.

Description of the Related Art

Communication protocols include Hypertext Transfer Protocol version 1.1 (HTTP/1.1) used as an Internet standard technology (https://tools.ietf.org/html/rfc2616), and HTTP/2, as a new version of HTTP, of which the standardization is currently being performed by an Internet standardization organization (Internet Engineering Task Force (IETF)) (https://tools.ietf.org/html/rfc7540).

When HTTP/1.1 is used, a server and a client are connected to each other through a transmission control protocol (TCP) connection, and the client transmits a request to the server through the connection. The client cannot transmit a next request until the client receives a response to the request returned from the server. However, if a plurality of TCP connections is used, the client can transmit, in parallel, as many requests as the TCP connections used.

On the other hand, when HTTP/2 is used, a plurality of logical sessions, i.e., streams, is established (multiplexing) in a TCP connection between a server and a client. The client can transmit requests in parallel through the respective streams. Thus, when HTTP/2 is used, the requests can be transmitted in parallel without being restricted by the number of established TCP connections.

However, it does not necessarily mean that communications can be completed in a short period by using one of the communication protocols HTTP/1.1 and HTTP/2 at all times.

For example, when requests more than the number of TCP connections are transmitted in using HTTP/1.1, some of the requests cannot be transmitted until the responses to the requests are returned. Thus, time required for returning responses to the requests becomes longer.

On the other hand, with the feature of HTTP/2, since the number of streams is not limited by the number of TCP connections, all the requests can be transmitted in parallel without the need of waiting for responses to the requests. Thus, HTTP/2 can achieve a shorter response time to the requests than that when HTTP/1.1 is used.

However, communications may be completed in a longer period of time in a case where HTTP/2 is used than in a case where HTTP/1.1 is used, for example, when a single HTTP request is transmitted. To start communications using HTTP/2, protocol upgrade needs to be performed when the communications are started. The communication protocol upgrade using a protocol upgrade mechanism involves an additional transaction between the server and the client. Thus, communications may be completed in a longer period in a case where HTTP/2 is used than in a case where HTTP/1.1 is used. This problem not only occurs between HTTP/1.1 and HTTP/2, but also occurs between HTTP/1.1 and SPDY™ (pronounced speedy) and between HTTP/1.1 and Quick User Datagram Protocol (UDP) Internet Connections (QUIC), for example.

SUMMARY

According to an aspect of the present disclosure, a communication apparatus includes a first acquisition unit configured to acquire a number of messages to be transmitted to another communication apparatus, and a determination unit configured to determine, based on the number of messages acquired by the first acquisition unit, a communication protocol to be used for a communication with the another communication apparatus from a plurality of communication protocols.

Further features of the present disclosure will become apparent from the following description of exemplary embodiments with reference to the attached drawings.

BRIEF DESCRIPTION OF THE DRAWINGS

FIG. 5 is a diagram illustrating a history of connection between the communication apparatus and the server.

DESCRIPTION OF THE EMBODIMENTS

An exemplary embodiment according to the present disclosure is described below with reference to the drawings.

Figure 1:
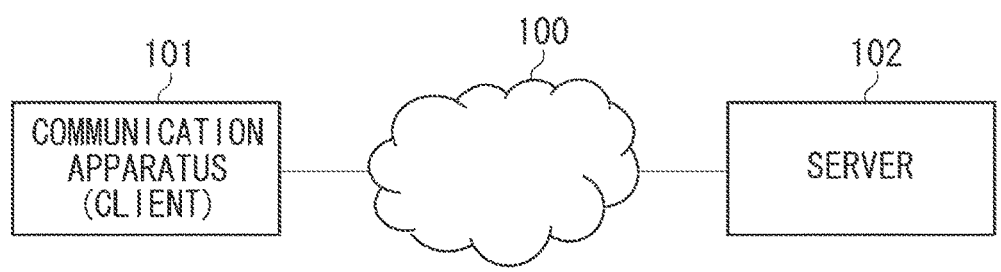
FIG. 1 is a diagram illustrating a configuration of a communication system.

FIG. 1 is a diagram illustrating an example of a configuration of a communication system.

A communication apparatus 101 and a server 102 are connected to a network 100. In the present exemplary embodiment, the network 100 is not limited to a particular form, and for example, is established by using at least one of the Internet, a wide area network (WAN), and a local area network (LAN). The communication apparatus 101 and the server 102 may be directly connected to each other without the network 100 therebetween. For example, the communication apparatus 101 and the server 102 may communicate with each other through a wireless ad-hoc network.

The communication apparatus 101 communicates with the server 102 through the network 100. The communication apparatus 101, when communicating with the server 102, serves as a client. In the present exemplary embodiment, an example is described where the communication apparatus 101 selects (determines) one of the communication protocols, HTTP/1.1 and HTTP/2, when communicating with the server 102. In other words, the communication apparatus 101 according to the present exemplary embodiment determines a communication protocol to be used for communications with the server 102 (another communication apparatus), from a plurality of communication protocols.

The server 102 returns a response to a request, transmitted from the communication apparatus 101, to the communication apparatus 101.

Figure 2:
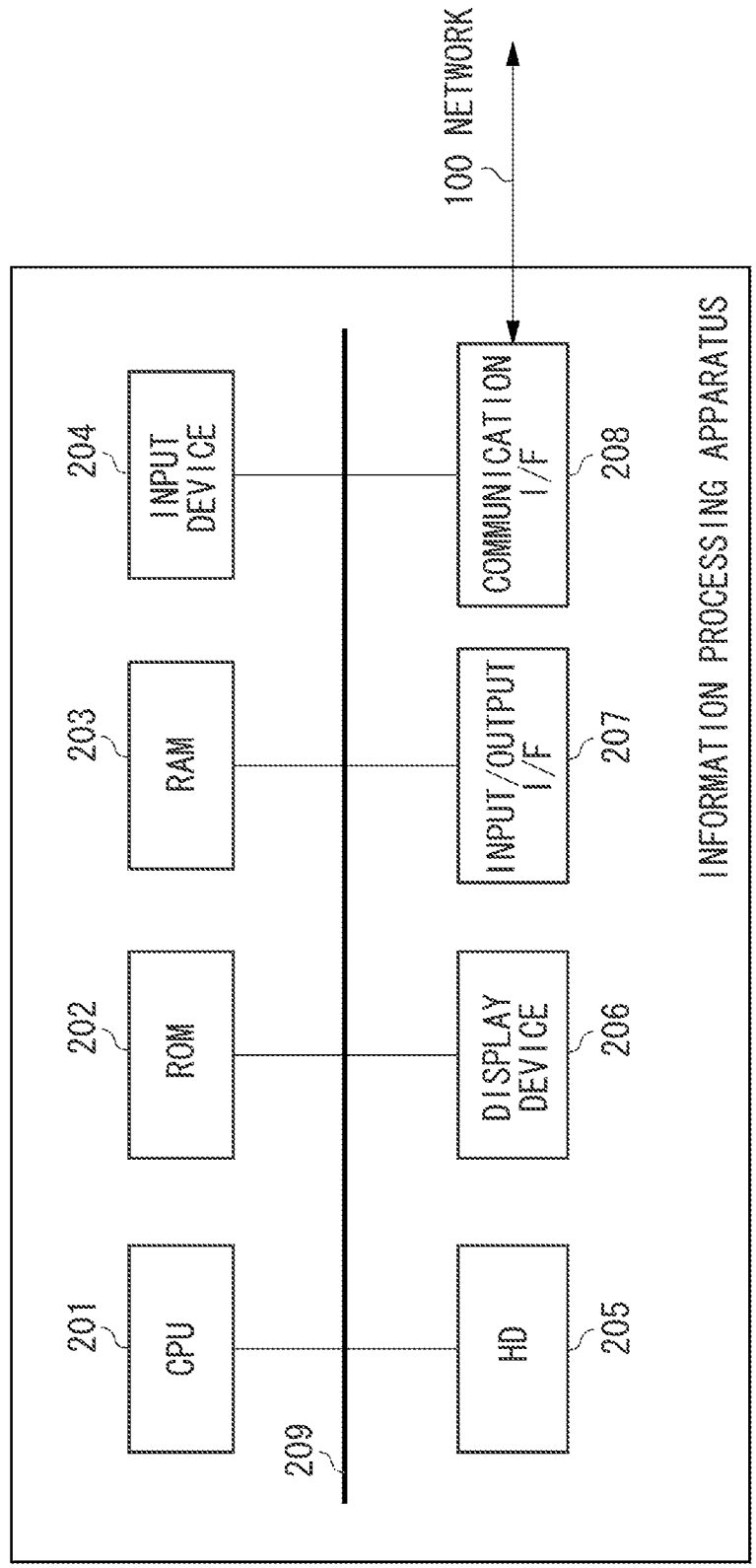
FIG. 2 is a diagram illustrating a hardware configuration of each of a communication apparatus and a server.

FIG. 2 is a diagram illustrating an example of a hardware configuration of an information processing apparatus as an example of a configuration which is applied to the communication apparatus 101 and the server 102. The communication apparatus 101 can be applied to an image capturing apparatus, a printer, and a projector. Thus, hardware, required for an apparatus to which the communication apparatus 101 is applied, is added to the configuration illustrated in FIG. 2. In the present exemplary embodiment, an example is described in which the server 102 is implemented as a single information processing apparatus (personal computer (PC)). Alternatively, the server 102 may include a proxy server or may be arranged on the cloud in a distributive manner.

In FIG. 2, an information processing apparatus 200 includes a central processing unit (CPU) 201, a read only memory (ROM) 202, and a random access memory (RAM) 203. The information processing apparatus 200 further includes an input device 204, a hard disk (HD) 205, a display device 206, and an input/output interface (I/F) 207, a communication I/F 208, and a system bus 209.

The CPU 201 performs overall control on operations in the information processing apparatus 200, and controls the components (202 to 208) of the information processing apparatus 200 through the system bus 209.

The ROM 202 stores basic input/output system (BIOS) and operation system (OS) programs, serving as control programs for the CPU 201. The ROM 202 stores a program required for the CPU 201 to execute processing described below.

The RAM 203 functions as a main memory and a work area for the CPU 201. Upon executing the processing, the CPU 201 reads a required program from the ROM 202, and required information from the HD 205, and then loads the program and the information onto the RAM 203. Then, the CPU 201 executes the program and processing the information to implement various operations. The input device 204 is used by a user to perform an input operation for the information processing apparatus 200 as necessary, for example. The input device 204 is formed of at least one of a mouse, a keyboard, a touch panel, a button, and a switch, for example.

The HD 205 serves as a storage unit that stores various pieces of data, and files.

The display device 206 includes a computer display, such as a liquid crystal display, and displays various pieces of information and images, based on control performed by the CPU 201. The display device 206 includes a light emitting unit such as a light emitting diode (LED), in addition to the computer display.

The input/output I/F 207 outputs and receives data to and from a portable storage medium, based on control performed by the CPU 201.

The communication I/F 208 transmits and receives various pieces of information to and from an external device through the network, based on control performed by the CPU 201.

The system bus 209 is a bus that connects among the CPU 201, the ROM 202, the RAM 203, the input device 204, the HD 205, the display device 206, the input/output I/F 207, and the communication I/F 208 so as to enable communication among them.

Figure 3:
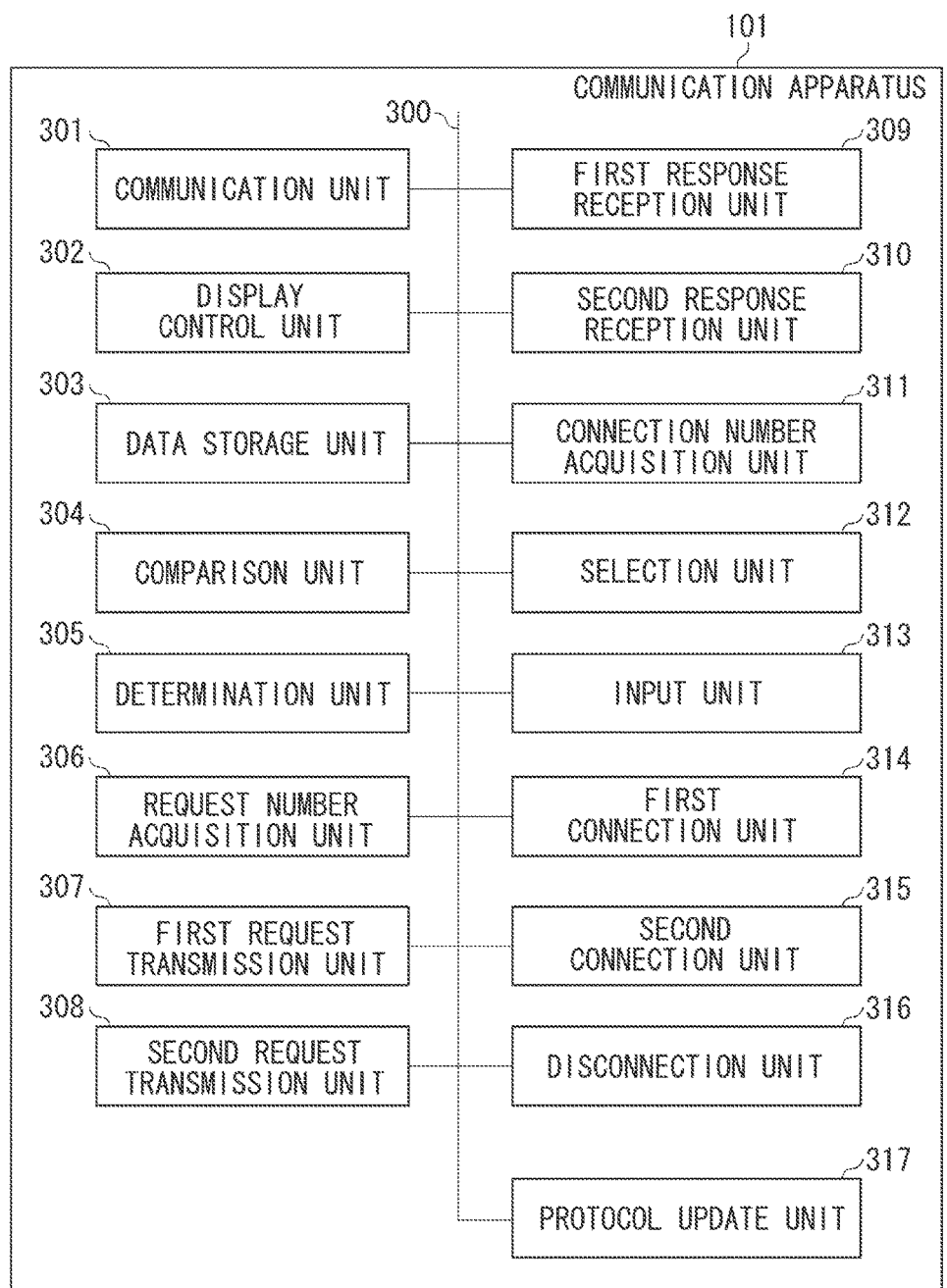
FIG. 3 is a diagram illustrating a module configuration of the communication apparatus.

FIG. 3 is a diagram illustrating an example of a module configuration of the communication apparatus 101.

A bus 300 is used for connecting modules 301 to 307 described below so as to enable communication therebetween.

A communication unit 301 executes transmission control protocol/Internet protocol (TCP/IP) processing and transport layer security (TLS) processing.

A display control unit 302 executes processing of causing the display device 206 (the liquid display and the LED) to display a communication protocol used for communications. The present disclosure is not limited to the example described in the present exemplary embodiment, where the communication protocol used for communications is displayed. The communication apparatus 101 may notify the user of the communication protocol used for communications, through sounds and vibrations in addition to or instead of the displaying.

A data storage unit 303 stores and manages history information associated with an identifier of the server 102, which is described below with reference to FIG. 5. In the present exemplary embodiment, a database, for the history information associated with an identifier of the server 102, is stored in the communication apparatus 101. However, it is not limited thereto, and the history information associated with an identifier of the server 102 may be stored in a database of another device connected through the network 100.

A comparison unit 304 compares the number of TCP connections usable for communications between the communication apparatus 101 and the server 102, with the number of HTTP requests. The comparison unit 304 also compares the number of TCP connections successfully established with the server 102, with the number of HTTP requests.

A determination unit 305 determines whether to continue transmission of an HTTP request after receiving an HTTP response to the HTTP request from the server 102. The determination unit 305 also determines whether the communications have been performed with the server 102, based on an identifier of the server 102 input to the communication apparatus 101. The determination unit 305 further determines whether protocol upgrade can be omitted when the communications are performed with the server 102.

A request number acquisition unit 306 executes first acquisition processing of acquiring the number of HTTP requests.

A first request transmission unit 307 transmits an HTTP request to the server 102 using HTTP/1.1.

A second request transmission unit 308 transmits an HTTP request to the server 102 using HTTP/2.

A first response reception unit 309 receives an HTTP response to the HTTP request transmitted by the first request transmission unit 307, from the server 102.

A second response reception unit 310 receives an HTTP response to the HTTP request transmitted by the second request transmission unit 308, from the server 102.

A connection number acquisition unit 311 executes second acquisition processing of acquiring the number of TCP connections that can be used by the communication apparatus 101.

A selection unit 312 selects one of HTTP/1.1 and HTTP/2 as a communication protocol used for communications with the server 102.

An input unit 313 receives the identifier of the server 102. The identifier of the server 102 includes a uniform resource identifier (URI), an internet protocol (IP) address, a port number, and a session-identifier (ID), for example. The user can input the identifier of the server 102 to the input unit 313 by using a user interface (UI). Furthermore, the user can input the identifier of the server 102 by using near field communications (NFC), and Bluetooth (registered trademark). The identifier of the server 102 stored in an application may be used as information to be input to the input unit 313.

A first connection unit 314 establishes a connection, for performing communications using HTTP/1.1, between the communication apparatus 101 and the server 102.

A second connection unit 315 establishes a connection, for performing communications using HTTP/2, between the communication apparatus 101 and the server 102.

A disconnection unit 316 disconnects the connection, for performing communications using HTTP/1.1 and HTTP/2, established with the server 102.

A protocol upgrade unit 317 performs protocol upgrade, and determines whether the protocol upgrade has been successfully performed.

In the present exemplary embodiment, a case is described where the communication apparatus 101 selects HTTP/1.1 or HTTP/2 as the communication protocol used for communications with the server 102. However, the communication protocol (first and second protocols) for the communications between the communication apparatus 101 and the server 102 is not limited to these. For example, a communication protocol other than HTTP/1.1 may be used as a communication protocol for establishing a plurality of connections, and transmitting a plurality of messages in parallel using the respective connections. A communication protocol other than HTTP/2 may be used as a communication protocol for transmitting a plurality of messages in parallel by using a plurality of logical streams established on a single connection. For example, SPDY™ (pronounced speedy) or QUIC may be used instead of HTTP/2. Furthermore, selection between other types of communication protocols, different from those described above, may be performed. Furthermore, a communication protocol may be selected from three or more communication protocols.

Figure 4:
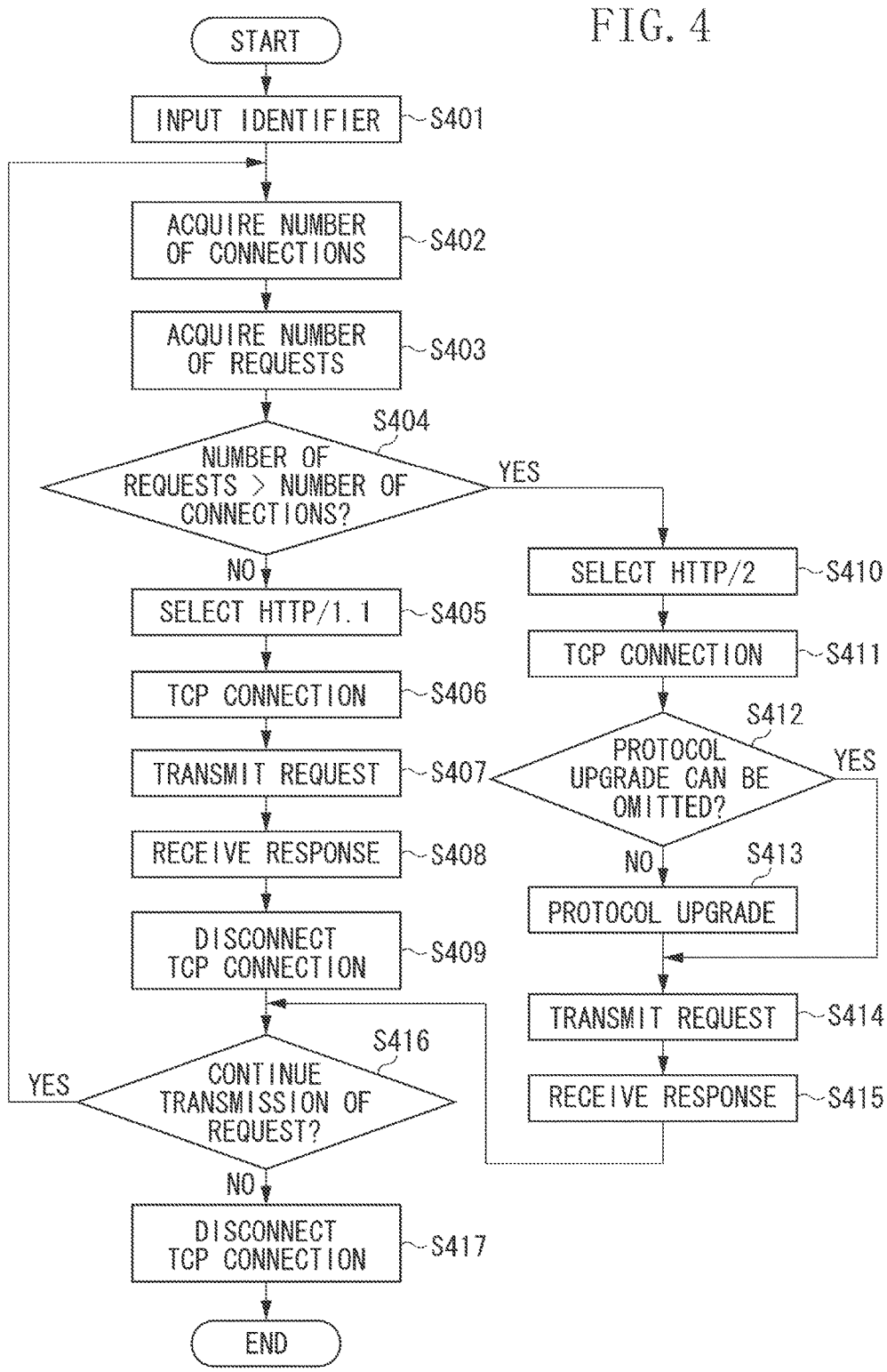
FIG. 4 is a flowchart illustrating processing executed by the communication apparatus.

FIG. 4 is a flowchart illustrating an example of processing executed by the communication apparatus 101 when communicating with the server 102.

In step S401, the input unit 313 receives the identifier of the server 102. The input unit 313 may acquire the identifier of the server 102 based on a result of an operation performed by the user, or may acquire the identifier of the server 102 from an application. In the present exemplary embodiment, the identifier of the server 102 may include the URI, the IP address, the port number, and the session-ID. However, the identifier of the server 102 is not limited to these, and may be any other information for identifying the server 102 as a communication partner.

Next, in step S402, the connection number acquisition unit 311 acquires the number of TCP connections usable for the communications between the communication apparatus 101 and the server 102.

For example, the connection number acquisition unit 311 may acquire the number of TCP connections that can be used by the communication apparatus 101 as a whole, or the number of TCP connections defined by an application.

The connection number acquisition unit 311 may acquire the number of TCP connections, usable for the communications between the communication apparatus 101 and the server 102, in such a manner that a balance with other applications on the communication apparatus 101 is achieved. For example, the connection number acquisition unit 311 acquires a value obtained by dividing the number of TCP connections that can be used by the communication apparatus 101 as a whole, by the number of applications installed in the communication apparatus 101. However, the obtaining method is not limited to this. The connection number acquisition unit 311 may acquire the number of TCP connections usable for the communications between the communication apparatus 101 and the server 102 with a different method, such as a method of achieving balance with other applications based on throughputs, for example.

The connection number acquisition unit 311 may acquire the number of TCP connections acceptable by the server 102 as the number of TCP connections usable for the communications between the communication apparatus 101 and the server 102. The connection number acquisition unit 311 may acquire the number of TCP connections acceptable by the server 102 from the server 102 directly with the NFC, Bluetooth (registered trademark), or the like, or from another communication apparatus. The connection number acquisition unit 311 may communicate with the server 102 through a plurality of connections, and acquire the number of connections actually accepted by the server 102.

The connection number acquisition unit 311 may take into account either one or both of the number of TCP connections that can be used by the communication apparatus 101 as a whole and the number of TCP connections acceptable by the server 102. Thus, the connection number acquisition unit 311 can acquire the number of TCP connections usable for the communications between the communication apparatus 101 and the server 102, based on both of these numbers. For example, the connection number acquisition unit 311 may use the smaller one of the number of TCP connections that can be used by the communication apparatus 101 as a whole and the number of TCP connections acceptable by the server 102. Here, the number of TCP connections defined by an application may be used instead of the number of TCP connections that can be used by the communication apparatus 101 as a whole.

In a case where a history of connection between the communication apparatus 101 and the server 102 is available, the connection number acquisition unit 311 may acquire the number of connections corresponding to the identifier of the server 102 from a past history of connection.

FIG. 5 is a diagram illustrating an example of the history of connection between the communication apparatus 101 and the server 102.

A table 500 illustrated in FIG. 5 is obtained as a result of storing the identifier of the server 102 and history information indicating the history of connection between the communication apparatus 101 and the server 102, while being associated with each other. For example, the table 500 is stored in a data storage unit 303.

FIG. 5 illustrates an example where the identifier of the server 102 is information including the session-ID, the IP address, the port number, and the URI. However, the identifier of the server 102 is not limited to these, and may be any information with which the server 102 as the communication partner can be uniquely identified. Thus, other identifiers such as session initiation protocol (SIP) URI may be used.

FIG. 5 illustrates an example where the history information is information including the maximum number of connections, the number of requests, and information indicating whether the communications using HTTP/2 is available. However, the history information is not limited to this, and may include setting information for other layers, for example. For example, the history information may include a maximum transmission unit (MTU) size, a window size of the TCP, protocol information of an application, and application setting information. The maximum number of connections is a maximum value of the number of TCP connections usable for the communications using HTTP/1.1. The number of requests is the number of HTTP requests transmitted from the communication apparatus 101 to the server 102. Whether the HTTP/2 is available indicates whether the server 102 can perform the communications using HTTP/2.

The determination unit 305 determines whether the table 500 illustrated in FIG. 5 includes the identifier of the server 102 input in step S401. In a case where the result of the determination indicates that the table 500 includes the identifier of the server 102, the connection number acquisition unit 311 can acquire the maximum number of connections corresponding to the identifier of the server 102 from the table 500.

The connection number acquisition unit 311 can acquire the number of TCP connections that have already been established as the number of TCP connections usable for the communications between the communication apparatus 101 and the server 102. When the processing proceeds from step S415 described below to step S402 (In a case where the processing in step S402 is repeated), the connection number acquisition unit 311 may use the number of TCP connections that has been acquired in step S402 in the past.

The connection number acquisition unit 311 having failed in the above-described acquisition of the number of TCP connections, usable for the communications between the communication apparatus 101 and the server 102, can use a default value. In this case, the communication apparatus 101 may determine that an error has occurred and terminate the communications with the server 102. Here, the display control unit 302 can cause the display device 206 to display a message indicating the error.

Then, in step S403, the request number acquisition unit 306 acquires the number of HTTP requests.

An example of a method of acquiring the number of HTTP requests is described below.

For example, the request number acquisition unit 306 can acquire the number of files uploaded from the communication apparatus 101 to the server 102, or the number of files downloaded from the server 102 to the communication apparatus 101, as the number of HTTP requests.

Requests may be periodically transmitted from the communication apparatus 101 to the server 102 for polling, for example. In such a case, when the number of requests periodically transmitted is fixed, the request number acquisition unit 306 can acquire this value as the number of HTTP requests.

The communication apparatus 101 may be required to transmit an additional request to the server 102 before receiving the responses to all the requests. More specifically, the additional request needs to be transmitted to the server 102 before receiving the responses to all the requests, in a case where a webpage is downloaded, or in a case where a communication protocol such as SOAP (Simple Object Access Protocol) is used. In such a case, the request number acquisition unit 306 can set the number of HTTP requests including the additional request.

The request number acquisition unit 306 can identify a service provided by the server 102 based on information about an address, a port number, and a URI of the server 102 as the connection destination, and can acquire the number of requests corresponding to the identified service as the number of HTTP requests.

In a case where a history of connection between the communication apparatus 101 and the server 102 is available, the request number acquisition unit 306 can acquire the number of requests corresponding to the identifier of the server 102 from the past history of connection (see FIG. 5).

The request number acquisition unit 306 can acquire a value acquired in the past by the request number acquisition unit 306 as the number of HTTP requests.

The request number acquisition unit 306 having failed in the above-described acquisition of the number of HTTP requests can use a default value. In this case, the communication apparatus 101 may determine that an error has occurred and terminate the communications with the server 102. Here, the display control unit 302 can cause the display device 206 to display a message indicating the error.

In the present exemplary embodiment, an example is described where the connection number acquisition unit 311 acquires the number of TCP connections, and then the request number acquisition unit 306 acquires the number of HTTP requests. However, an order in which the number of TCP connections and the number of HTTP requests are acquired is not limited to the order described above.

In step S404, the comparison unit 304 determines whether the number of HTTP requests acquired by the request number acquisition unit 306 exceeds the number of TCP connections acquired by the connection number acquisition unit 311. In a case where it is determined that the number of HTTP requests is equal to or smaller than the number of TCP connections (No in step S404), the communications for the request is likely to be completed within a shorter period of time in the case where HTTP/1.1 is selected, than in the case where HTTP/2 is selected, and thus the processing proceeds to step S405. Thus, in a case where the number of HTTP requests is equal to or smaller than the number of TCP connections, all the HTTP requests can be transmitted substantially in parallel, and processing of upgrading the protocol from HTTP/1.1 to HTTP/2 is not required. Thus, the comparison unit 304 determines that in a case where the number of HTTP requests is equal to or smaller than the number of TCP connections, the communications for the request are likely to be completed in a shorter period of time in the case where HTTP/1.1 is used than in the case where HTTP/2 is used.

On the other hand, in a case where the number of HTTP requests exceeds the number of TCP connections (Yes in step S404), the communications for the request are likely to be completed within a shorter period of time in the case where HTTP/2 is selected, than in the case where HTTP/1.1 is selected, and thus the processing proceeds to step S410. More specifically, in a case where the number of HTTP requests exceeds the number of TCP connections, all the HTTP requests cannot be transmitted substantially in parallel. Thus, the comparison unit 304 determines that the communications for the request can be completed in a shorter period of time in the case where HTTP/2 is used than in the case where HTTP/1.1 is used, even though a time for executing the processing of upgrading the protocol from HTTP/1.1 to HTTP/2 is required. As described above, in a case where either one of the number of HTTP requests and the number of TCP connections or both cannot be acquired, the comparison unit 304 can perform the comparison by using the default value, and the communication apparatus 101 may determine that the error has occurred and terminate the communications.

When the comparison unit 304 can recognize that the server 102 does not support HTTP/2 in advance, the determination in step S404 can be omitted, and the processing may proceed to step S405. The comparison unit 304 can recognize that the server 102 does not support HTTP/2 by referring to the history of connection with the identifier of the server 102 (see FIG. 5). The comparison unit 304 can acquire information indicating that the server 102 does not support HTTP/2 from another communication apparatus.

In a case where the comparison unit 304 can recognize that the server 102 does not support HTTP/1.1 in advance, the determination in step S404 can be omitted, and the processing may proceed to step S410. The comparison unit 304 can recognize that the server 102 does not support HTTP/1.1 by referring to the history of connection with the identifier of the server 102 (see FIG. 5). The comparison unit 304 can acquire information indicating that the server 102 does not support HTTP/1.1 from another communication apparatus.

In a case where the comparison unit 304 can recognize that the server 102 does not support HTTP/1.1 or HTTP/2 in advance, the communication apparatus 101 may communicate with the server 102 with a communication protocol, other than HTTP/1.1 or HTTP/2, supported by the server 102. In such a case, the communication apparatus 101 may determine that a communication error has occurred and terminate the communications.

In a case where the communication apparatus 101 periodically transmits requests to the server 102 as described above, the number of HTTP requests transmitted each time is fixed. Thus, it may be recognizable in advance that the number of HTTP requests is equal to or smaller than the number of TCP connections. For example, it is recognizable that the number of HTTP requests is equal to or smaller than the number of TCP connections when the number of HTTP requests transmitted each time is "1". In such a case, the processing in steps S402 and S404 is omitted, and the processing may proceed to step S405.

When it is determined, in step S404, that the number of HTTP requests is equal to or smaller than the number of TCP connections, the selection unit 312 selects HTTP/1.1 as the communication protocol used for communications with the server 102 in step S405.

Next, in step S406, the first connection unit 314 establishes the TCP connection with the server 102. The number of TCP connections established by the first connection unit 314 in this process is equal to or larger than the number of HTTP requests. In a case where the TCP connections for HTTP/1.1 have already been established, the first connection unit 314 may use a part of or all the TCP connections already established for HTTP/1.1 without newly establishing TCP connections.

After the TCP connections are established, the display control unit 302 causes the display device 206 (the liquid crystal display and the LED) to display information indicating that HTTP/1.1 is used for the communications.

Next, in step S407, the first request transmission unit 307 transmits an HTTP/1.1 request to the server 102 using the TCP connection established by the first connection unit 314.

Then, in step S408, the first response reception unit 309 receives a response to the request, transmitted from the first request transmission unit 307 to the server 102.

Then, in step S409, the disconnection unit 316 disconnects the TCP connections. The disconnection unit 316 may disconnect each TCP connection with which the response has been received, or may disconnect all the TCP connections after all the responses are received from the server 102.

In a case where the server 102 supports persistent connection, the disconnection unit 316 may disconnect the TCP connections after waiting for a predetermined period of time (for example, 10 minutes) to reuse the TCP connections.

The processing proceeds to step S416 described below, when the TCP connections are disconnected as described above.

In a case where the server 102 does not support persistent connection, if HTTP/1.1 is selected, the TCP connections need to be disconnected each time an HTTP request is transmitted. In a case where the transmission of HTTP requests continues in such a state, the communications may be completed in a shorter period of time by selecting HTTP/2 instead of selecting HTTP/1.1. Thus, in a case where the server 102 does not support persistent connection, the determination in step S404 can be omitted, and the processing may proceed to step S410. This procedure can be implemented by including information indicating whether the server 102 supports persistent connection in the history of connection (history information) illustrated in FIG. 5. The comparison unit 304 can acquire the information indicating whether the server 102 supports persistent connection, from another communication apparatus.

In a case where the determination in step S404 indicates that the number of HTTP requests exceeds the number of TCP connections (Yes in step S404), the selection unit 312 selects HTTP/2 as the communication protocol used for communications with the server 102 in step S410.

Then, in step S411, the second connection unit 315 establishes TCP connections with the server 102.

The second connection unit 315 may establish any number of TCP connections that is equal to or larger than one.

In a case where the TCP connections for HTTP/2 have already been established, the second connection unit 315 may use a part of or all the TCP connections already established for HTTP/2 without newly establishing TCP connections.

After the TCP connections are established, the display control unit 302 causes the display device 206 (the liquid crystal display and the LED) to display information indicating that HTTP/2 is used for the communications.

Next, in step S412, in a case where the communications using HTTP/2 can be performed with the server 102, the determination unit 305 determines whether the protocol upgrade can be omitted. The protocol upgrade can be omitted for performing the communications using HTTP/2 in a case where it can be recognized in advance that the server 102, i.e., the communication partner, supports HTTP/2.

The determination unit 305 can check if the server 102 supports HTTP/2 by referring to the history of connection using the identifier of the server 102. Alternatively, the determination unit 305 can acquire the information indicating whether the server 102 supports HTTP/2 directly from the server 102 using the NFC, and Bluetooth (registered trademark). Alternatively, the determination unit 305 can acquire the information indicating whether the server 102 supports HTTP/2 from another communication apparatus. However, the method for determining whether the server 102 supports HTTP/2 is not limited to these.

In step S412, the determination unit 305 may determine that the protocol upgrade can be omitted when the TCP connections for HTTP/2 have already been established so that the communications can be performed by using the TCP connections.

When it is determined that the protocol upgrade cannot be omitted (No in step S412), the processing proceeds to step S413, in which the protocol upgrade unit 317 performs the protocol upgrade. The protocol upgrade unit 317 can upgrade the communication protocol with an HTTP upgrade mechanism. The protocol upgrade unit 317 can also upgrade the communication protocol with transport layer security (TLS)—application layer protocol negotiation (ALPN) extension.

After the protocol upgrade is successfully completed or omitted, in step S414, the second request transmission unit 308 transmits an HTTP/2 request to the server 102.

Then, in step S415, the second response reception unit 310 receives a response to the request transmitted from the second request transmission unit 308 to the server 102, and the processing proceeds to step S416.

In step S416, the determination unit 305 determines whether to continue transmission of an HTTP request. A case where the transmission of an HTTP request continues includes a case where the HTTP request is periodically transmitted, a case where a new HTTP request is transmitted for a result of receiving the HTTP response, and a case where a new HTTP request is transmitted with a user operation.

The determination unit 305 may determine whether to continue the transmission of a request, before or after the first response reception unit 309 or the second response reception unit 310 receives all the responses.

When the transmission of an HTTP request continues (Yes in step S416), the processing returns to step S402, and the processing from step S402 to step S416 is repeated until the transmission of the HTTP request is completed.

When the determination unit 305 determines not to continue the transmission of an HTTP request (No in step S416), the processing proceeds to step S417, in which the disconnection unit 316 disconnects the TCP connections. The disconnection unit 316 may disconnect each TCP connection with which the response has been received, or may disconnect all the TCP connections after all the responses are received from the server 102. The disconnection unit 316 may disconnect the TCP connections after waiting for a predetermined period of time (for example, 10 minutes) to reuse the TCP connections.

A possible case where the transmission of an HTTP request continues includes a case where the TCP connections for HTTP/2 have already been established, corresponding to a case where the processing proceeds from step S415 to step S402. In such a case, the protocol upgrade can be omitted because the communications can be performed with the already established TCP connections. In such a circumstance, the communication may be completed in a shorter period of time using HTTP/2 selected instead of HTTP/1.1. Thus, in a case where the TCP connections for HTTP/2 have already been established, the determination in step S404 can be omitted, and the processing may proceed to step S410.

FIG. 4 illustrates an example where the first connection unit 314 is assumed to successfully establish the TCP connections that are equal to or larger in number than the number of HTTP requests acquired in step S403. However, the first connection unit 314 may fail to establish such TCP connections in a case where, for example, the server 102 cannot accept the connection from the communication apparatus 101 because the TCP connections have been established between the server 102 and another communication apparatus. Furthermore, the first connection unit 314 may fail to establish the TCP connections that are equal to or larger in number than the number of HTTP requests even in a case where the number of TCP connections that can be used by the communication apparatus 101 changes under the influence of another application.

Figure 6:
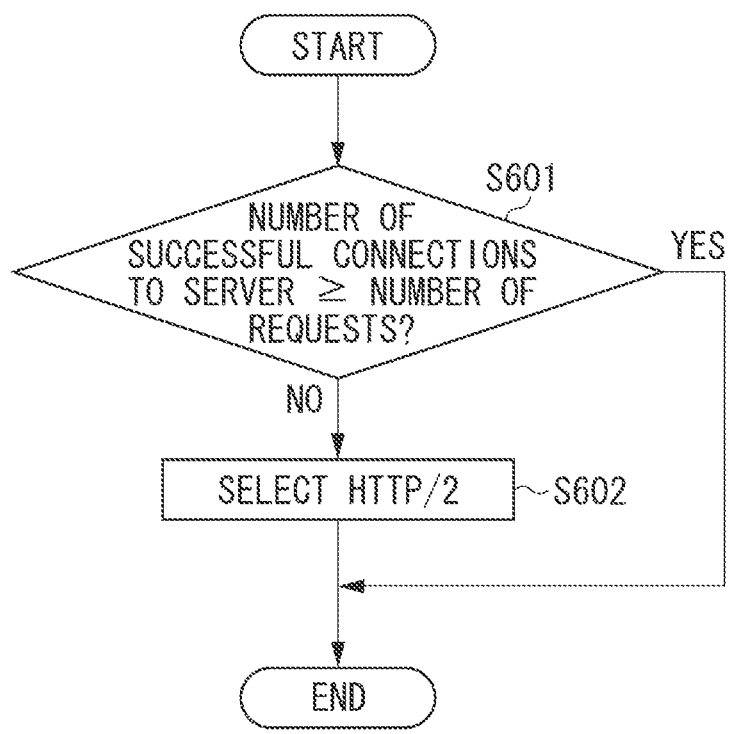
FIG. 6 is a flowchart illustrating a first example of a method of selecting a communication protocol.

FIG. 6 is a flowchart illustrating an example of a method for selecting a communication protocol on the assumption that the TCP connections, equal to or more than the number of HTTP requests acquired in step S403, cannot be established. Processing in the flowchart illustrated in FIG. 6 is executed in a period between step S406 and S407 in FIG. 4, for example.

In step S601, the comparison unit 304 determines whether the number of TCP connections, established by the first connection unit 314 (more specifically, the number of TCP connections successfully established with the server 102), is equal to or larger than the number of HTTP requests acquired in step S403.

When it is determined that the number of TCP connections, established by the first connection unit 314, is equal to or larger than the number of HTTP requests (Yes in step S601), the first request transmission unit 307 transmits the HTTP/1.1 request to the server 102. In this case, the processing proceeds to step S407 in FIG. 4, after the processing in the flowchart in FIG. 6 is terminated.

On the other hand, when the number of TCP connections established by the first connection unit 314 is smaller than the number of HTTP requests (No in step S601), the processing proceeds to step S602, in which the selection unit 312 selects HTTP/2 as the communication protocol used for the communications with the server 102. In this case, the processing proceeds to step S411 in FIG. 4, after the processing in the flowchart in FIG. 6 is terminated.

The processing in the flowchart of FIG. 4 is described using an example where the server 2 supports HTTP/2 on the assumption that the protocol upgrade is successfully performed. However, it can be considered that the server 102 does not support HTTP/2. In a case where it is recognized that the server 102 does not support HTTP/2 as a result of the protocol upgrade, HTTP/1.1 needs to be selected.

Figure 7:
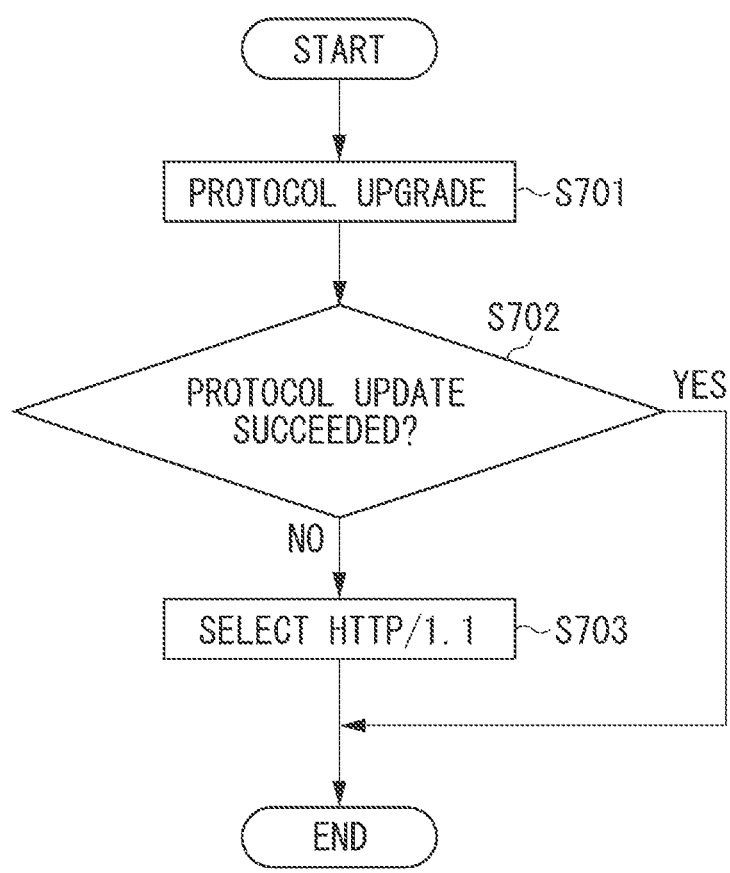
FIG. 7 is a flowchart illustrating a second example of the method of selecting a communication protocol.

FIG. 7 is a flowchart illustrating an example of a method for selecting the communication protocol on the assumption that the server 102 does not support HTTP/2. Processing in the flowchart in FIG. 7 is executed instead of the processing in step S413 in FIG. 4, for example.

In step S701, the protocol upgrade unit 317 performs the protocol upgrade as in step S413 in FIG. 4.

Then, in step S702, the protocol upgrade unit 317 determines whether the protocol upgrade has successfully performed.

When it is determined that the protocol upgrade has successfully performed (Yes in step S702), the communications using HTTP/2 can be performed. In this case, the processing proceeds to step S414 in FIG. 4, after the processing in the flowchart in FIG. 7 is terminated.

On the other hand, when the protocol upgrade fails (No in step S702), the communications using HTTP/2 cannot be performed. Thus, the selection unit 312 selects HTTP/1.1 as the communication protocol used for the communications with the server 102. In this case, the processing proceeds to step S406 in FIG. 4, after the processing in the flowchart in FIG. 7 is terminated.

Figure 8:
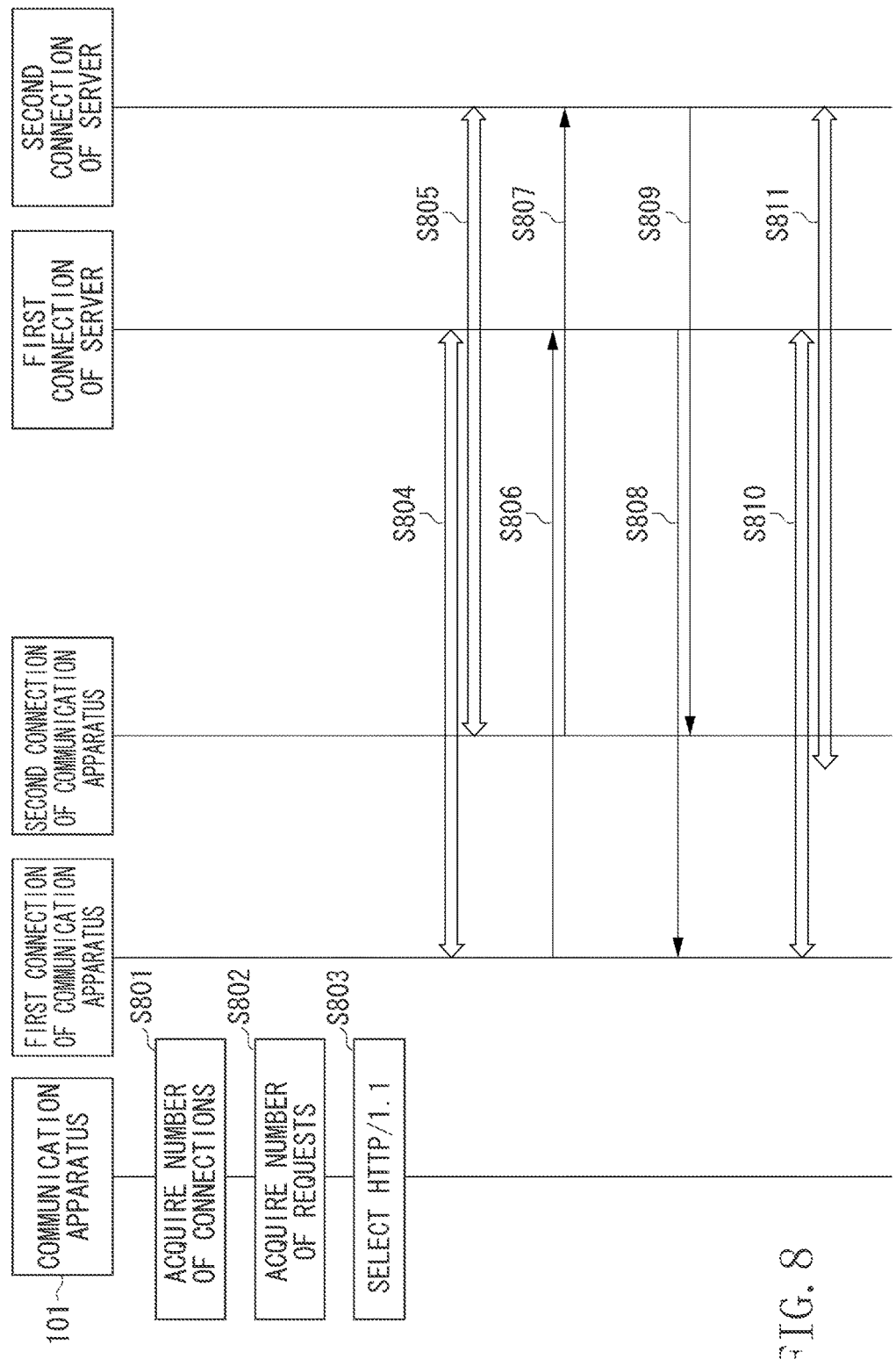
FIG. 8 is a diagram illustrating a first example of a sequence in the communication system.

FIG. 8 illustrates an example of a sequence in the communication system in a case where the communications using HTTP/1.1 are performed.

In the present exemplary embodiment, the number of TCP connections acquired by the connection number acquisition unit 311 is "two", and the number of HTTP requests acquired by the request number acquisition unit 306 is "two". Thus, the comparison unit 304 determines that the number of HTTP requests is equal to or smaller than the number of TCP connections (No in step S404), and the selection unit 312 selects HTTP/1.1 in step S405. Here, in step S416, the determination unit 305 determines not to continue the transmission of requests (No in step S416).

In step S801, the connection number acquisition unit 311 acquires the number of TCP connections that is two in this example.

Then, in step S802, the request number acquisition unit 306 acquires the number of HTTP requests that is two in this example.

Then, in step S803, the selection unit 312 selects HTTP/1.1 as the communication protocol used for the communications with the server 102.

Then, in step S804, the first connection unit 314 establishes a first TCP connection between the communication apparatus 101 and the server 102.

Then, in step S805, the first connection unit 314 establishes a second TCP connection between the communication apparatus 101 and the server 102.

Then, in step S806, the first request transmission unit 307 transmits a first HTTP request with the first TCP connection.

Then, in step S807, the first request transmission unit 307 transmits a second HTTP request with the second TCP connection.

Then, in step S808, the first response reception unit 309 receives a first HTTP response to the first HTTP request.

Then, in step S809, the first response reception unit 309 receives a second HTTP response to the second HTTP request.

Then, in step S810, the disconnection unit 316 disconnects the first TCP connection.

Finally, in step S811, the disconnection unit 316 disconnects the second TCP connection.

Figure 9:
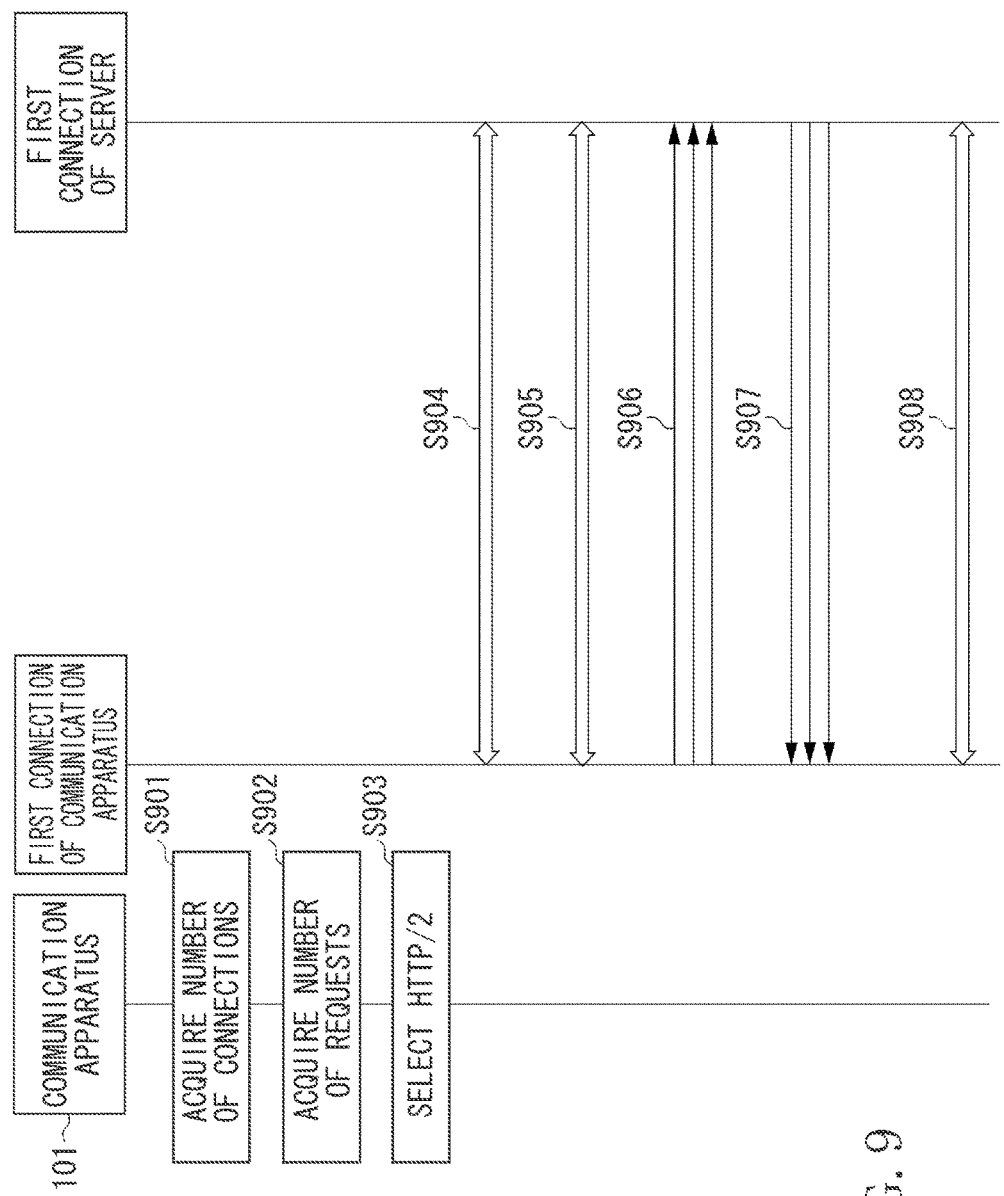
FIG. 9 is a diagram illustrating a second example of the sequence in the communication system.

FIG. 9 is a diagram illustrating an example of a sequence in the communication system in a case where the communications using HTTP/2 are performed.

In the present exemplary embodiment, the number of TCP connections acquired by the connection number acquisition unit 311 is "two", and the number of HTTP requests acquired by the request number acquisition unit 306 is "three". Thus, the comparison unit 304 determines that the number of HTTP requests exceeds the number of TCP connections (Yes in step S404), and the selection unit 312 selects HTTP/2 in step S410. Here, in step S416, the determination unit 305 determines not to continue the transmission of the requests (No in step S416).

Steps S901 and S902 are respectively the same as steps S801 and 802 in FIG. 8.

In step S903, the selection unit 312 selects HTTP/2 as the communication protocol used for the communications with the server 102.

Then, in step S904, the second connection unit 315 establishes one TCP connection between the communication apparatus 101 and the server 102.

Then, in step S905, the communication apparatus 101 performs the protocol upgrade.

Then, in step S906, the second request transmission unit 308 transmits an HTTP/2 request.

Then, in step S907, the second response reception unit 310 receives an HTTP/2 response.

Finally, in step S908, the disconnection unit 316 disconnects the TCP connection.

Figure 10:
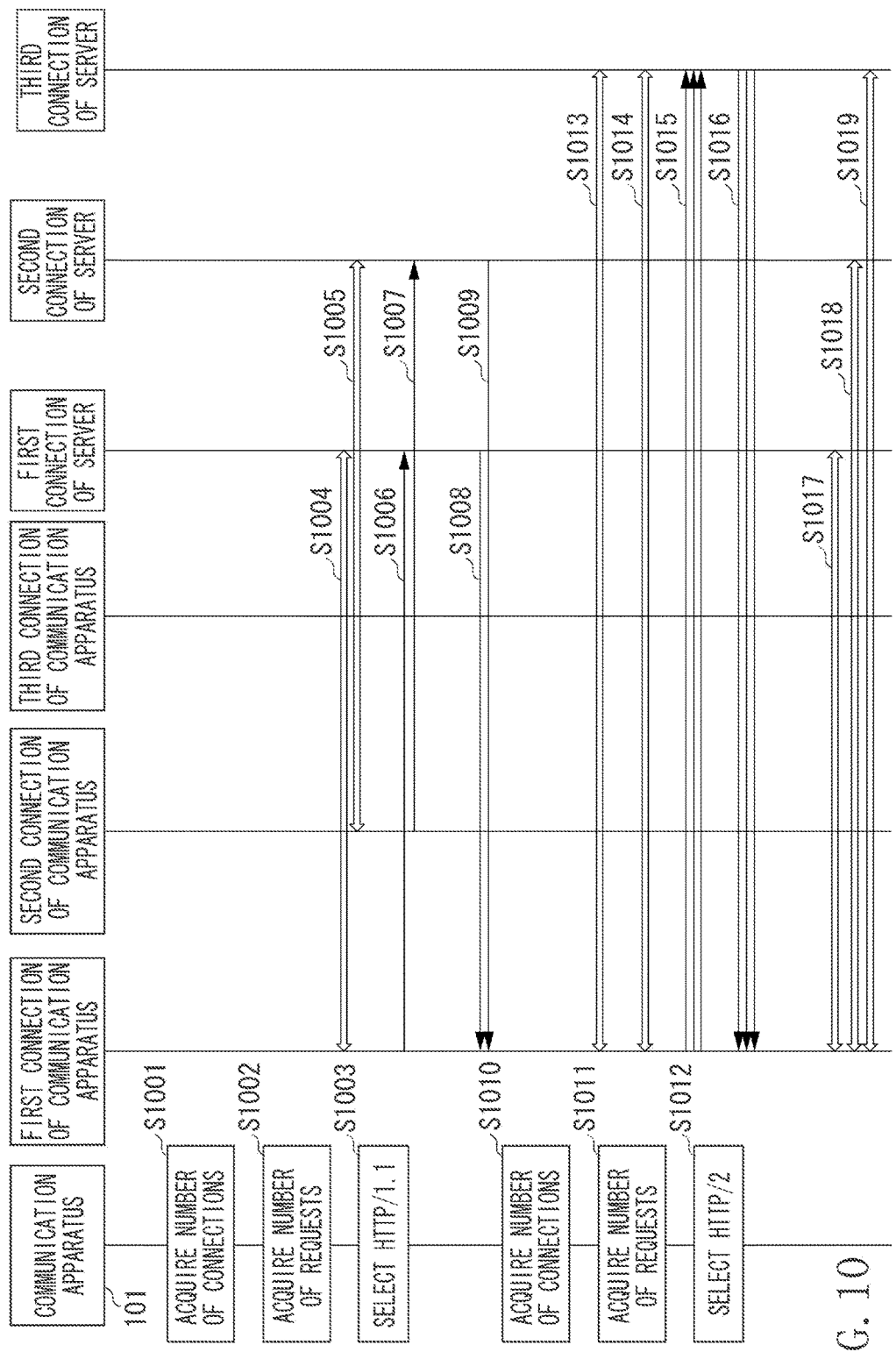
FIG. 10 is a diagram illustrating a third example of the sequence in the communication system.

FIG. 10 is a diagram illustrating an example of a sequence in the communication system in a case where the transmission of HTTP requests continues.

In the present exemplary embodiment, the number of connections acquired by the connection number acquisition unit 311 for the first time is "two", and the number of HTTP requests acquired by the request number acquisition unit 306 for the first time is "two". Thus, the comparison unit 304 determines that the number of HTTP requests is equal to or smaller than the number of TCP connections in step S404 (No in step S404), and the selection unit 312 selects HTTP/1.1 in step S405. Here, in step S416, the determination unit 305 determines to continue the transmission of the requests (Yes in step S416).

The number of connections acquired by the connection number acquisition unit 311 for the second time is "two", and the number of HTTP requests acquired by the request number acquisition unit 306 for the second time is "three". Thus, the comparison unit 304 determines that the number of HTTP requests exceeds the number of TCP connections (Yes in step S404), and the selection unit 312 selects HTTP/2 in step S410. Here, in step S416, the determination unit 305 determines not to continue the transmission of the requests (No in step S416).

Steps S1001 to S1009 are respectively the same as steps S801 to S809 in FIG. 8.

Steps S1010 to S1016 are respectively the same as steps S901 to S917 in FIG. 9.

In step S1017, the disconnection unit 316 disconnects the first TCP connection between the communication apparatus 101 and the server 102.

Then, in step S1018, the disconnection unit 316 disconnects the second TCP connection between the communication apparatus 101 and the server 102.

Finally, in step S1019, the disconnection unit 316 disconnects a third TCP connection between the communication apparatus 101 and the server 102.

As described above, in the present exemplary embodiment, HTTP/2 is used in a case where the number of HTTP requests to the server 102 exceeds the number of TCP connections usable for the communications between the communication apparatus 101 and the server 102, and otherwise HTTP/1.1 is used. Thus, the communication protocol that is more likely to achieve a shorter period of time to complete the communications can be easily selected in a short period of time. Thus, a shorter waiting time of the user can be achieved, whereby high usability can be achieved in the communication system.

The exemplary embodiments described above are merely an example of implementing the present disclosure, and thus the technical scope of the present disclosure should not be construed in a limiting sense due to the exemplary embodiments. Thus, the present disclosure can be implemented in various ways without departing from the technical idea or main features thereof.

With the configuration according to the present exemplary embodiment, communications by a communication apparatus that can use a plurality of communication protocols can be completed in a short period of time.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-083327, filed Apr. 15, 2015, which is hereby incorporated by reference herein in its entirety.

What is claimed is:

1. A communication apparatus comprising:
an acquisition unit configured to acquire information regarding a number of Hypertext Transfer Protocol (HTTP) requests to be transmitted consecutively to another communication apparatus for communication with the another communication apparatus; and
a determination unit configured to determine a communication protocol,
wherein, in a case where the number of HTTP requests to be transmitted consecutively to the another communication apparatus is less than a threshold value, the determination unit is configured to determine a first communication protocol as a communication protocol to be used for communication with the another communication apparatus,
wherein, in a case where the number of HTTP requests to be transmitted consecutively to the another communication apparatus is not less than the threshold value, the determination unit is configured to determine a second communication protocol as a communication protocol to be used for communication with the another communication apparatus, and
wherein consecutive transmission of a plurality of HTTP requests based on a single transmission control protocol (TCP) connection is allowed in the second communication protocol.

2. The communication apparatus according to claim 1, further comprising:
a second acquisition unit configured to acquire a number of HTTP connections that can be established by the communication apparatus for the communication with the another communication apparatus; and
a comparison unit configured to perform a comparison between the number of HTTP requests to be transmitted consecutively to the another communication apparatus and the number of HTTP connections, as the threshold value, acquired by the second acquisition unit,
wherein, based on a result of the comparison performed by the comparison unit, the determination unit is configured to determine one of the plurality of communication protocols as the communication protocol to be used for the communication with the another communication apparatus.

3. The communication apparatus according to claim 1, wherein the first communication protocol is HTTP/1.1, and the second communication protocol is HTTP/2.

4. The communication apparatus according to claim 2, further comprising a storage unit configured to store, based on a result of a past communication with the another communication apparatus, the number of HTTP connections that can be established for the communication with the another communication apparatus,
wherein the second acquisition unit is configured to acquire, from the storage unit, the number of HTTP connections that can be established for the communication with the another communication apparatus.

5. The communication apparatus according to claim 2, wherein the plurality of communication protocols include the second communication protocol with which a plurality of HTTP requests can be transmitted in parallel to the another communication apparatus using a plurality of streams set between the communication apparatus and the another communication apparatus based on a single connection, and
wherein, in a case where, as a result of the comparison performed by the comparison unit, the number of HTTP requests to be transmitted consecutively to the another communication apparatus exceeds the number of HTTP connections acquired by the second acquisition unit, the determination unit is configured to determine the second communication protocol as the communication protocol to be used for the communication with the another communication apparatus.

6. The communication apparatus according to claim 5, wherein the second communication protocol is HTTP/2, a SPDY based protocol, or Quick User Datagram Protocol (UDP) Internet Connections (QUIC).

7. The communication apparatus according to claim 6, further comprising:
a storage unit configured to store information indicating whether the another communication apparatus can use the second communication protocol based on a result of the communication with the another communication apparatus; and
a protocol upgrade unit configured to perform a communication with the another communication apparatus to upgrade a communication protocol from the first communication protocol to the second communication protocol, before the HTTP request is transmitted,
wherein, in a case where the information in the storage unit indicates that the another communication can use the second communication protocol, the communication performed by the protocol upgrade unit is omitted for the another communication apparatus.

8. The communication apparatus according to claim 1, further comprising an output unit configured to output information indicating the communication protocol determined by the determination unit.

9. A communication method for a communication apparatus, the communication method comprising:
acquiring information regarding a number of Hypertext Transfer Protocol (HTTP) requests to be transmitted consecutively to another communication apparatus for communication with the another communication apparatus; and
determining a communication protocol,
wherein, in a case where the number of HTTP requests to be transmitted consecutively to the another communication apparatus is less than a threshold value, determining includes determining a first communication protocol as a communication protocol to be used for communication with the another communication apparatus, wherein, in a case where the number of HTTP requests to be transmitted consecutively to the another communication apparatus is not less than the threshold value, determining includes determining a second communication protocol as a communication protocol to be used for communication with the another communication apparatus, and wherein consecutive transmission of a plurality of HTTP requests based on a single transmission control protocol (TCP) connection is allowed in the second communication protocol.

10. The communication method according to claim 9, further comprising:

acquiring, as a second acquisition, a number of HTTP connections that can be established by the communication apparatus for the communication with the another communication apparatus; and performing a comparison between the number of HTTP requests to be transmitted consecutively to the another communication apparatus and the number of HTTP connections, as the threshold value, acquired by the second acquisition, wherein, based on a result of the performed comparison, determining includes determining one of the plurality of communication protocols as the communication protocol to be used for the communication with the another communication apparatus.

11. The communication method according to claim 10, wherein the plurality of communication protocols include the second communication protocol with which a plurality of HTTP requests can be transmitted in parallel to the another communication apparatus using a plurality of streams set between the communication apparatus and the another communication apparatus based on a single connection, and wherein, in a case where, as a result of the performed comparison, the number of HTTP requests to be transmitted consecutively to the another communication apparatus exceeds the number of HTTP connections acquired by the second acquisition, determining includes determining the second communication protocol as the communication protocol to be used for the communication with the another communication apparatus.

12. A non-transitory storage medium storing a program to cause a computer to perform a communication method for a communication apparatus, the communication method comprising:

acquiring information regarding a number of Hypertext Transfer Protocol (HTTP) requests to be transmitted consecutively to another communication apparatus for communication with the another communication apparatus; and determining a communication protocol, wherein, in a case where the number of HTTP requests to be transmitted consecutively to the another communication apparatus is less than a threshold value, determining includes determining a first communication protocol as a communication protocol to be used for communication with the another communication apparatus, wherein, in a case where the number of HTTP requests to be transmitted consecutively to the another communication apparatus is not less than the threshold value, determining includes determining a second communication protocol as a communication protocol to be used for communication with the another communication apparatus, and wherein consecutive transmission of a plurality of HTTP requests based on a single transmission control protocol (TCP) connection is allowed in the second communication protocol.

13. The non-transitory storage medium according to claim 12, the communication method further comprising:

acquiring, as a second acquisition, a number of HTTP connections that can be established by the communication apparatus for the communication with the another communication apparatus; and performing a comparison between the number of HTTP requests to be transmitted consecutively to the another communication apparatus and the number of HTTP connections, as the threshold value, acquired by the second acquisition, wherein, based on a result of the performed comparison, determining includes determining one of the plurality of communication protocols as the communication protocol to be used for the communication with the another communication apparatus.

14. The non-transitory storage medium according to claim 13, wherein the plurality of communication protocols include the second communication protocol with which a plurality of HTTP requests can be transmitted in parallel to the another communication apparatus using a plurality of streams set between the communication apparatus and the another communication apparatus based on a single connection, and wherein, in a case where, as a result of the performed comparison, the number of HTTP requests to be transmitted consecutively to the another communication apparatus exceeds the number of HTTP connections acquired by the second acquisition, determining includes determining the second communication protocol as the communication protocol to be used for the communication with the another communication apparatus.

* * * * *